United States Patent [19]
Morgan

[11] Patent Number: 5,396,216
[45] Date of Patent: Mar. 7, 1995

[54] VEHICLE THEFT DETERRENT SYSTEM INCLUDING HOOD LOCKING MEANS

[76] Inventor: Lonnie Morgan, 1648 E. 21st St., Oakland, Calif. 94606

[21] Appl. No.: 98,043

[22] Filed: Jul. 28, 1993

[51] Int. Cl.$^6$ .............................................. B60R 25/10
[52] U.S. Cl. ..................................... 340/426; 307/10.3
[58] Field of Search ........................... 340/426, 425.5; 307/10.2, 10.3, 10.4, 10.6

[56] References Cited

U.S. PATENT DOCUMENTS

| | | | |
|---|---|---|---|
| 4,102,164 | 7/1978 | Barbush | 70/241 |
| 4,607,312 | 8/1986 | Barreto-Mercado | 361/172 |
| 4,831,356 | 5/1989 | Ito | 340/426 |

Primary Examiner—Jeffery A. Hofsass
Attorney, Agent, or Firm—Hugh E. Smith

[57] ABSTRACT

A theft deterrent system having two operational modes for selectively disabling a vehicle and sounding a siren. A first operational mode disables an engine component of the vehicle, sounds the siren, and locks the hood of the vehicle upon a use or a by-pass of the ignition switch. A second operational mode allows a use or a by-pass of the ignition switch to operate the vehicle for a predetermined amount of time before disabling an engine component, sounding the siren, and locking the hood of the vehicle. The system includes a keypad through which a controlling code may be entered, a remote keypad allowing the same, and a keypad disguising assembly for installation into a dashboard of the vehicle.

5 Claims, 4 Drawing Sheets

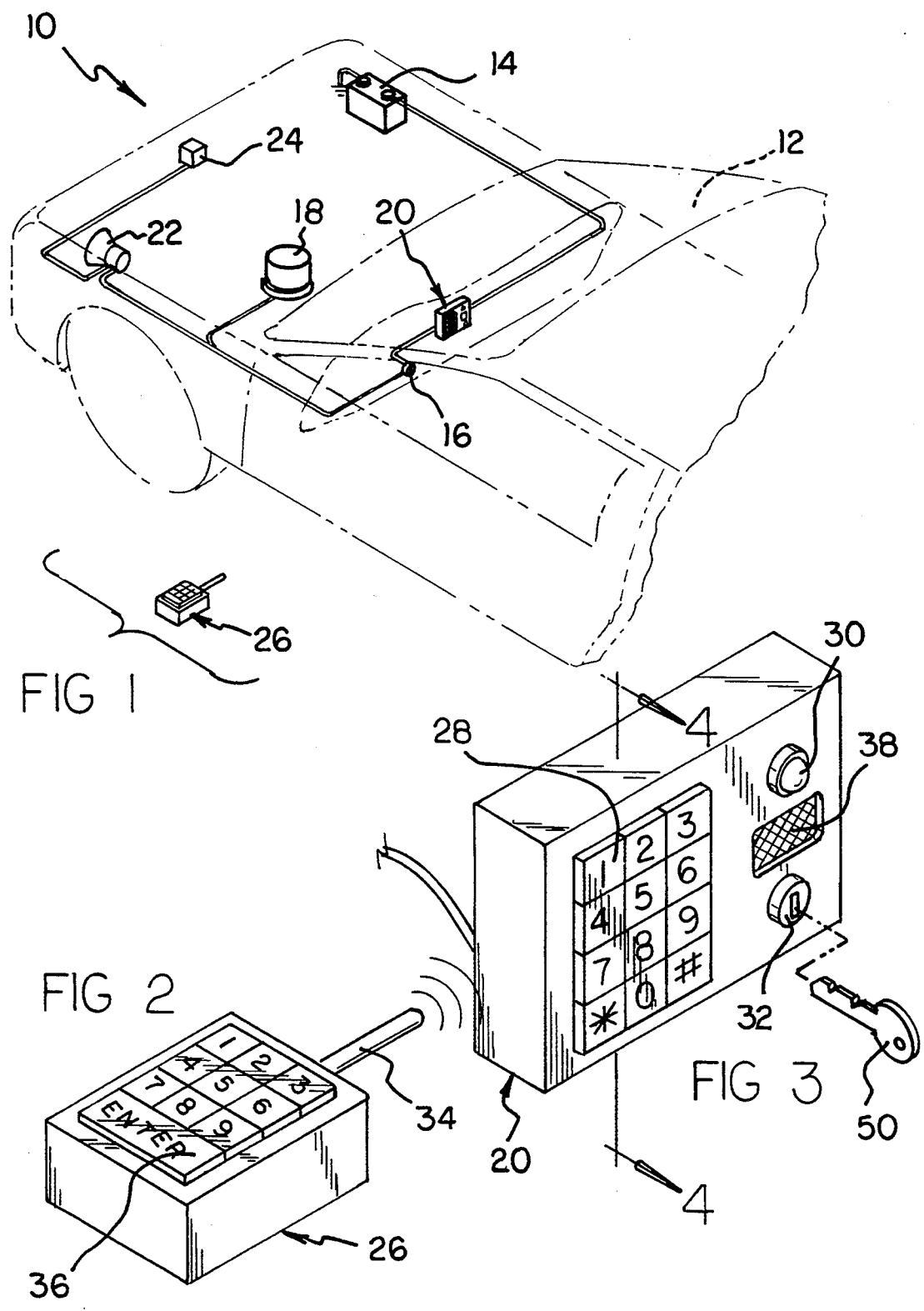

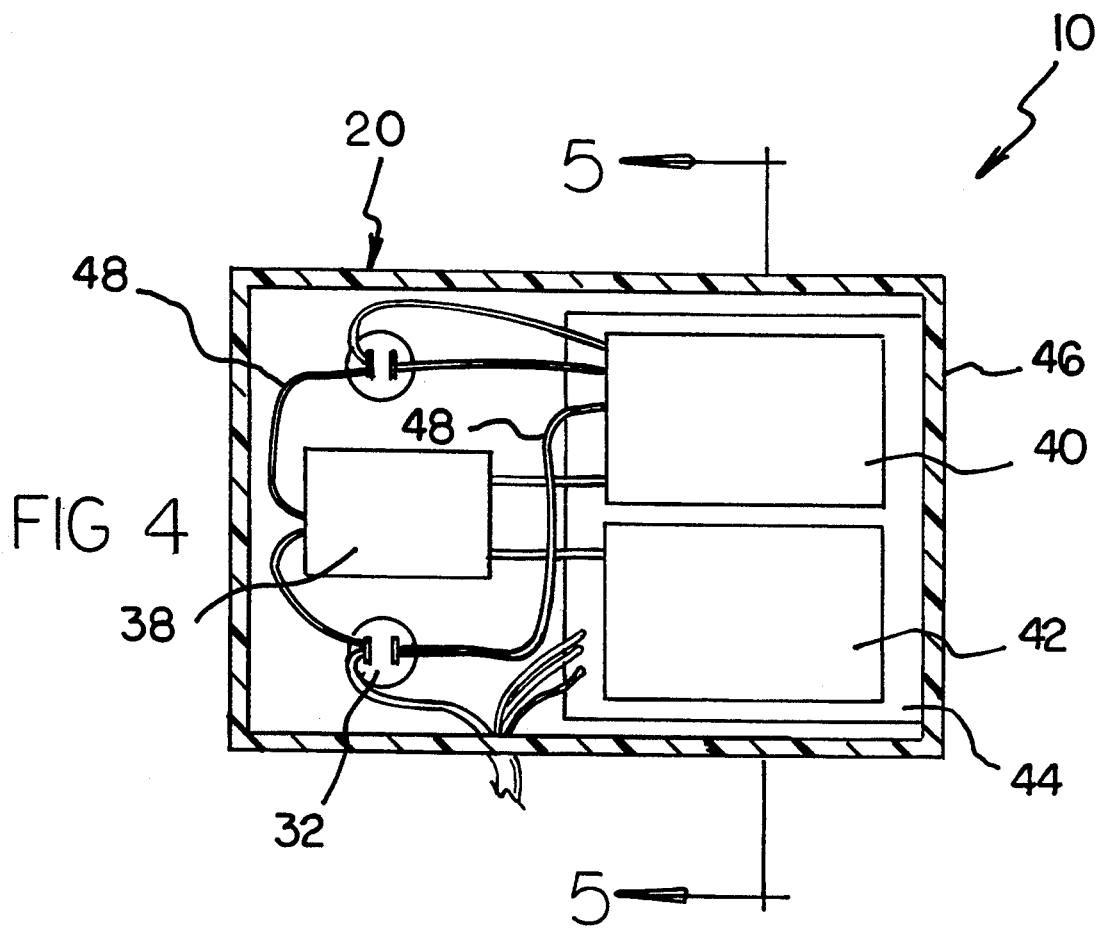
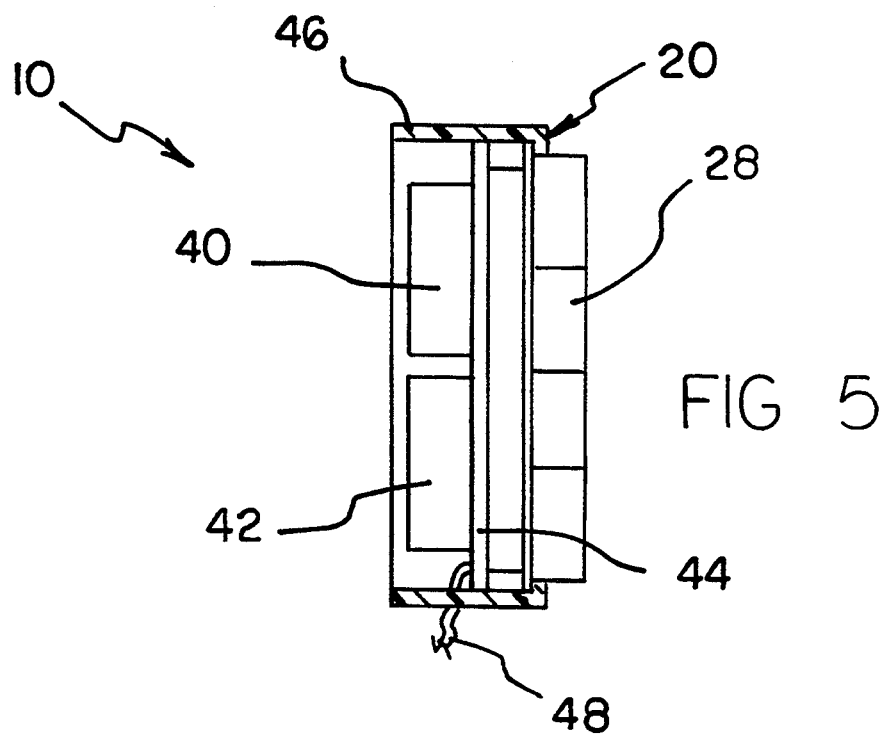

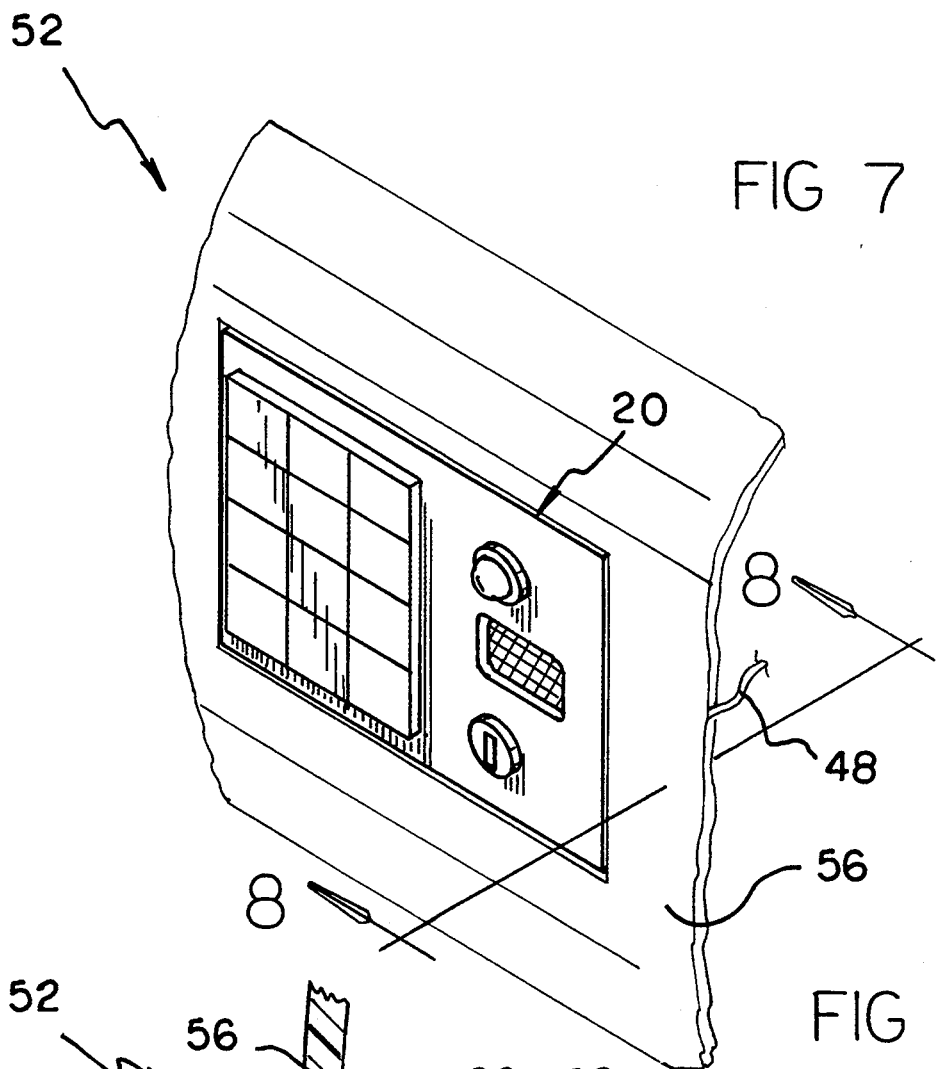
FIG 7
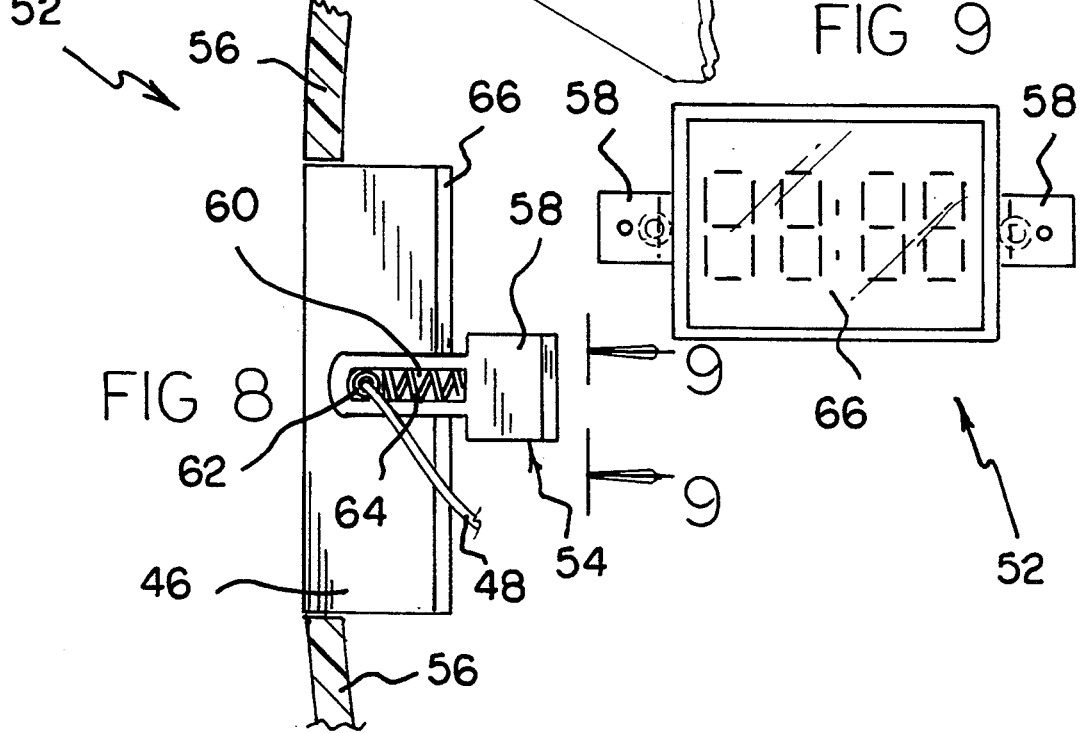
FIG 8
FIG 9

VEHICLE THEFT DETERRENT SYSTEM INCLUDING HOOD LOCKING MEANS

BACKGROUND OF THE INVENTION

1. Field of the Invention

The present invention relates to automobile alarms and more particularly pertains to vehicle theft deterrent systems which may be utilized for selectively disabling a vehicle and sounding a siren.

2. Description of the Prior Art

The use of automobile alarms is known in the prior art. More specifically, automobile alarms heretofore devised and utilized for the purpose of preventing a theft of an automobile are known to consist basically of familiar, expected and obvious structural configurations, notwithstanding the myriad of designs encompassed by the crowded prior art which have been developed for the fulfillment of countless objectives and requirements.

For example, an auto theft alarm is illustrated in U.S. Pat. No. 5,063,369 which includes a sound maker coupled to a complex switch having a plurality of switches arranged in series. An activation switch is coupled to the shock absorber of the vehicle so that the alarm is activated only by a motion up and down of the vehicle such as occurs during driving.

An auto alarm system is described in U.S. Pat. No. 4,782,321 which is responsive to a theft of the vehicle either by pulling the lock mechanism or by starting of the vehicle through the forced entry of the bowl plate. The alarm system further includes a signal system remote from the detection system for emitting a signal frequency for detection remote from the vehicle. The detector may include distance and direction detection from the detector to the vehicle.

Another patent of interest is U.S. Pat. No. 4,322,714 which discloses a vehicle anti-theft alarm. The alarm detects mechanical disturbances of the vehicle through primary disturbance sensors having steel balls or the like in small compartment inside which they are free to roll. Impacts of one or more balls against compartment walls generate pulses of high frequency sound and vibration, which are in turn sensed by an adjacent high frequency microphone or vibration pickup. The output of this transducer is then amplified and suitably processed to energize a horn or other alarm device.

Other patents of interest include U.S. Pat. No. 3,688,256 and U.S. Pat. No. 4,963,856.

While these devices fulfill their respective, particular objectives and requirements, the aforementioned patents do not describe a vehicle theft deterrent system having two operational modes for selectively disabling a vehicle and sounding a siren in which a first operational mode disables an engine component of the vehicle, sounds a siren, and locks a hood of the vehicle upon a use or by-pass of the ignition switch, and a second operational mode allows the vehicle to operate for a predetermined length of time before providing the same. In this respect, the vehicle theft deterrent system according to the present invention substantially departs from the conventional concepts and designs of the prior art, and in so doing provides an apparatus primarily developed for the purpose of selectively disabling a vehicle and sounding a siren upon a theft of such vehicle.

SUMMARY OF THE INVENTION

In view of the foregoing disadvantages inherent in the known types of automobile alarms now present in the prior art, the present invention provides a new vehicle theft deterrent system construction wherein the same can be utilized for selectively disabling a vehicle and sounding a siren upon a theft of such vehicle. As such, the general purpose of the present invention, which will be described subsequently in greater detail, is to provide a new vehicle theft deterrent system apparatus which has many of the advantages of the automobile alarms mentioned heretofore and many novel features that result in a vehicle theft deterrent system which is not anticipated, rendered obvious, suggested, or even implied by any of the prior art automobile alarms, either alone or in any combination thereof.

To attain this, the present invention essentially comprises a theft deterrent system having two operational modes for selectively disabling a vehicle and sounding a siren. A first operational mode disables an engine component of the vehicle, sounds the siren, and locks the hood of the vehicle upon a use or a by-pass of the ignition switch. A second operational mode allows a use or a by-pass of the ignition switch to operate the vehicle for a predetermined amount of time before disabling an engine component, sounding the siren, and locking the hood of the vehicle. The system includes a keypad through which a controlling code may be entered, a remote keypad providing the same, and a keypad disguising assembly for installation into a dashboard of the vehicle.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle theft deterrent system apparatus which has many of the advantages of the automobile alarms mentioned heretofore and many novel features that result in a vehicle theft deterrent system which is not anticipated, rendered obvious, suggested, or even implied by any of the prior art automobile alarms, either alone or in any combination thereof.

It is another object of the present invention to provide a new vehicle theft deterrent system which may be easily and efficiently manufactured and marketed.

It is a further object of the present invention to provide a new vehicle theft deterrent system which is of a durable and reliable construction.

An even further object of the present invention is to provide a new vehicle theft deterrent system which is susceptible of a low cost of manufacture with regard to both materials and labor, and which accordingly is then susceptible of low prices of sale to the consuming public, thereby making such vehicle theft deterrent systems economically available to the buying public.

Still yet another object of the present invention is to provide a new vehicle theft deterrent system which provides in the apparatuses and methods of the prior art some of the advantages thereof, while simultaneously overcoming some of the disadvantages normally associated therewith.

Still another object of the present invention is to provide a new vehicle theft deterrent system for selectively disabling a vehicle and sounding a siren upon a theft of such vehicle.

Yet another object of the present invention is to provide a new vehicle theft deterrent system having two operational modes in which a first operational mode disables an engine component, sounds a siren, and locks a hood of a vehicle upon either a use or by-pass of the ignition switch, and a second operational mode allows the vehicle to operate for a predetermined length of time before providing the same result specified for the first operational mode.

Even still another object of the present invention is to provide a new vehicle theft deterrent system which includes a keypad through which a controlling code may be entered, a remote keypad for entering the same, and a keypad disguising assembly which may be easily attached to an existing vehicle dashboard.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a vehicle theft deterrent system comprising the present invention as installed within a vehicle.

FIG. 2 is a perspective view of a portion of the present invention.

FIG. 3 is a perspective view of a further portion of the invention.

FIG. 4 is a cross sectional view taken along line 4—4 of FIG. 3.

FIG. 5 is a further cross sectional view taken along line 5—5 of FIG. 4.

FIG. 7 is a perspective view of second embodiment of the present invention.

FIG. 8 is a cross sectional view taken along line 8—8 of FIG. 7.

FIG. 9 is a rear elevation view of the second embodiment as viewed from line 9—9 of FIG. 8.

DESCRIPTION OF THE PREFERRED EMBODIMENT

Figure 6:
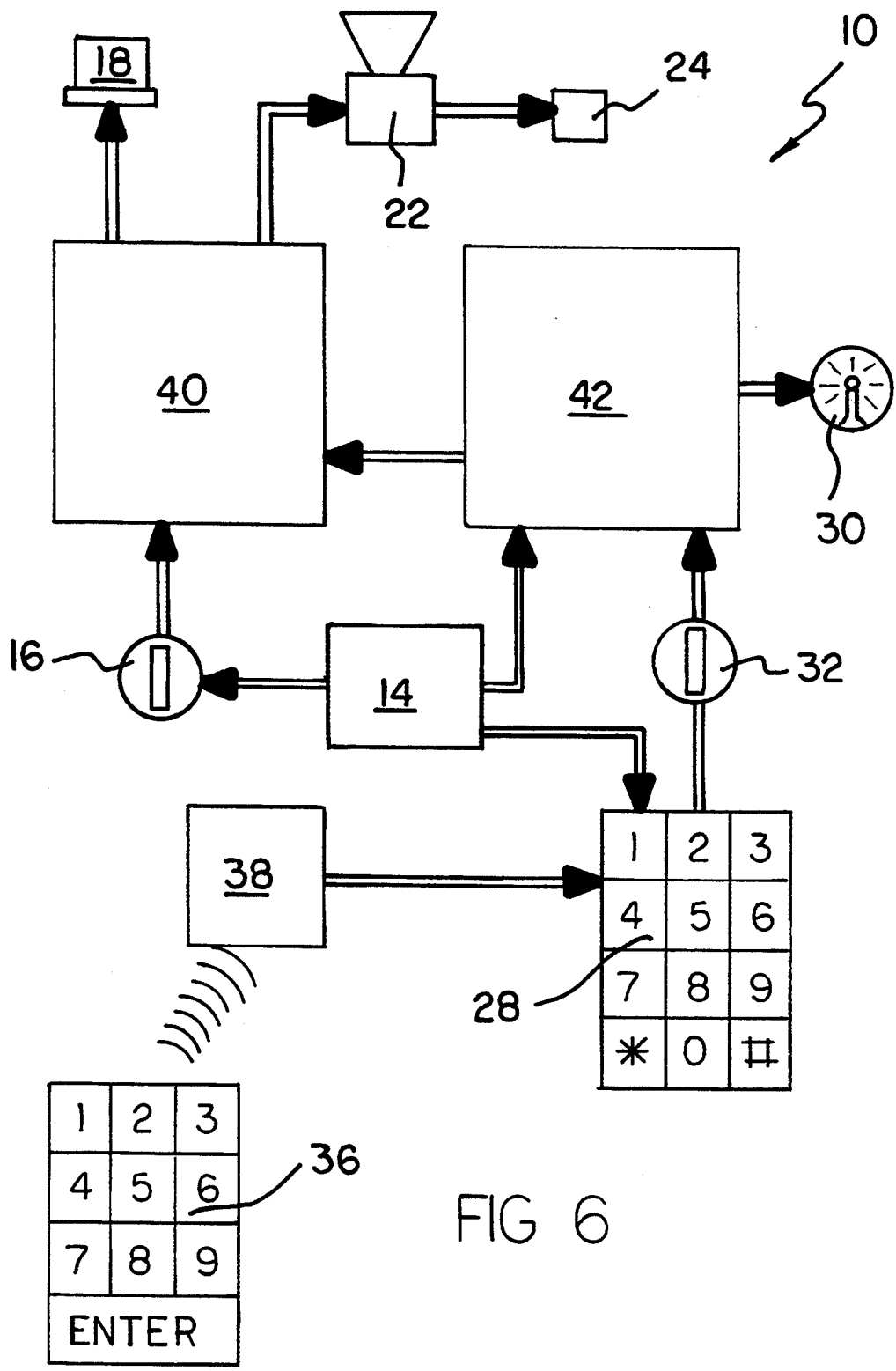
FIG. 6 is a diagram detailing an interaction of components of the present invention.

With reference now to the drawings, and in particular to FIGS. 1-6 thereof, a new vehicle theft deterrent system embodying the principles and concepts of the present invention and generally designated by the reference numeral 10 will be described.

A conventional automobile 12 typically includes a battery 14 which supplies electrical power through an ignition switch 16 to at least one electrically operated engine component 18. The ignition switch 16 is selectively operable by a user to control an operation of the engine of the vehicle 12. During a theft of the vehicle 12, the ignition switch 16 may be overridden or by-passed to allow an unauthorized use of the vehicle. The vehicle theft deterrent system 10 may be installed into a vehicle 12 so as to provide a means for selectively interrupting a flow of power from the battery 14 to the electrically operated engine component 18, thereby preventing an unauthorized use of the vehicle 12 from a use or a by-pass of the ignition switch 16. The vehicle theft deterrent system 10 comprises an alarm control assembly 20 electrically connected to both a siren 22 and a hood lock 24. The alarm control assembly 20 is operable to selectively disable the engine component 18, energize the siren 22, and actuate the hood lock 24 to preclude access into an engine compartment of the vehicle 12. A remote transmitter 26 may also be used to operate the alarm control system 20 from an exterior of the vehicle 12.

More specifically, it will be noted that the vehicle theft deterrent system 10 comprises an alarm control assembly 20 which is electrically connected to a battery 14, an ignition switch 16, and an electrically operated engine component 18 of a vehicle 12. The alarm control assembly 20 is operable to energize a siren 22, and actuate a hood lock 24 upon an unauthorized use of the vehicle 12. The alarm control assembly 20 includes a keypad 28 through which a controlling code may be entered to selectively change an operational mode of the alarm 10. A status of the alarm control assembly 20 may be ascertained from an indicator light 30 mounted thereon. The alarm control assembly 20 further includes a key switch 32 which may be utilized to selectively disable the vehicle theft deterrent system 10.

A remote transmitter 26 is illustrated in FIG. 2 and may be utilized to selectively operate the alarm control assembly 20 from an exterior of the vehicle 12. The remote transmitter 26 utilizes conventional electronics and includes an antenna 34 for generating a signal, such as a radio signal or an infrared signal, which corresponds to information entered through a remote keypad 36. A signal generated by the remote transmitter 26 is received by a receiver 38 which comprises a portion of the alarm control assembly 20. The remote transmitter 26 provides a similar use as that of the keypad 28 of the alarm control assembly 20.

The alarm control assembly 20 includes a timer 40 and a controller 42 which are both electrically connected to a circuit board 44 that supports them within a case 46, as illustrated in FIG. 4. The timer 40 and the controller 42 are electrically connected to the indicator light 30, the key switch 32, and the receiver 38 by a plurality of wires 48 which allow electrical communication therebetween. The keypad 28 is electrically connected to the circuit board 44 and mounted to an exterior surface of the case 46 for operation thereof by a user. A controlling code may be entered through the keypad 28 and received by the controller 42 through unillustrated electrical conductors present on the circuit board 44.

FIGS. 6 diagrams the interaction between the components of the vehicle theft deterrent system 10. The system 10 includes two operational modes which may be selectively operated by an entrance of a controlling code through either the keypad 28 or the remote keypad 36. The key switch 32 is operable to override both the keypad 28 and the receiver 38 to selectively enable or disable the vehicle theft deterrent system 10. The controller 42 receives electrical power from the battery 14 through the wires 48 and supplies such power to the timer 40. The ignition switch 16 is electrically connected to both the battery 14 and the timer 40 in such a manner so that at least one electrically operated engine component 18 may be selectively disabled by the timer. The siren 22 and the hood lock 24 are also in electrical communication with the timer 40 such that such an operation thereof may be provided.

The controller 42 may be set to the first operational mode by an entrance of a controlling code through the keypad 28 or through the remote keypad 36. The indicator light 30 is then energized by the controller 42 to indicate a selection of the first mode. Should an unauthorized user enter the vehicle and utilize or by-pass the ignition switch 16 the timer 40 will immediately disable the electrically operated engine component 18, thereby preventing a use of the vehicle 12. Furthermore, the timer 40 will also energize the siren 22 for a predetermined length of time and actuate the hood lock 24, thereby preventing an access to the engine compartment of the vehicle 12. After the predetermined length of time has elapsed, the controller 42 resets the timer 40 and the theft deterrent system 10 is again reset to the first operational mode.

The second operational mode may be selected by an entrance of a further controlling code through the keypad 28, the remote keypad 36, or, in the preferred embodiment of the instant invention, the second operational mode is selected through an operation of the ignition switch 16, thereby setting the controller 42 to the same after a use of the vehicle 12. Upon a theft attempt by an unauthorized user in which the ignition switch 16 is either operated or by-passed, the second operational mode allows the timer 40 to provide electrical power from the battery 14 to the engine component 18 for a specific length of time. After the specific length of time has elapsed, the engine component 18 will be disconnected from the battery 14, thereby preventing further operation of the vehicle 12. Furthermore, the second operational mode will then energize the siren 22 for a predetermined length of time, and actuate the hood lock 24 thereby preventing access to the engine compartment of the vehicle 12. After the predetermined length of time has elapsed, the controller 42 resets the theft deterrent system 10 to the second operational mode once again.

The alarm 10 may be selectively disabled by an authorized user who knows the controlling codes. The controlling codes may be entered through either the keypad 28 of the alarm control assembly 20 or the remote keypad 36 through the receiver 38 to disable the alarm 10. In the preferred embodiment, the ignition switch 16 must also be in the "on" position before the controlling codes may be entered into the alarm 10. The vehicle theft deterrent system 10 may also be selectively disabled by an authorized user who possesses an appropriate key 50 which will operate the key switch 32 in a well understood manner.

A second embodiment of the present invention as generally designated by the reference numeral 52 which comprises substantially all of the features of the foregoing embodiment 10 and which further comprises a keypad disguising assembly 54 will now be described. As best shown in FIGS. 7-9, it can be shown that the keypad disguising assembly 54 is operable to selectively disguise the alarm control assembly 20 within a vehicle dashboard 56. The alarm control assembly 20 may be mounted within an unlabeled aperture in the vehicle dashboard 56 and rotatably supported therein upon a pair of supports 58, as best shown FIG. 8. The supports 58 are substantially similar in function and design and each include an aperture 60 which allows a pin 62 to project therethrough. The pin is fixedly secured to the case 46 and is operable to slide within the aperture 60. A coil spring 64 biases the pin 62 towards a front end of the support 58. The supports 58 may be fixedly secured to a structure behind the vehicle dashboard 56 to support the alarm control assembly 20 within the unlabeled aperture in the vehicle dashboard.

The alarm control assembly 20 is rotatably supported by the pins 62 which engage the supports 58. The alarm control assembly 20 may be selectively rotated by pushing the control assembly into the dashboard against a force of the coil springs 64 and allowing the assembly to rotate upon the pins 62 into a new position, whereby a digital clock 66 may be viewed. The digital clock 66 is of a conventional design and is electrically connected to the alarm control assembly 20 to obtain electrical power therefrom. The digital clock 66 may be fully operational, or alternatively, may simply be a model clock which is not operational. The keypad disguising assembly 54 effectively conceals the alarm control assembly 20 from an unauthorized user.

As to further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new vehicle theft deterrent system for a vehicle having an ignition switch in electrical communication with at least one electrically operated engine component, said system comprising:
   a siren;
   an electrically actuated hood lock; and;
   an alarm circuit in electrical communication with both said siren and said electrically actuated hood lock, said alarm circuit being actuated upon an energization of said at least one electrically operated engine component, said alarm circuit comprising two operational modes in which a first operational mode energizes both said siren and said hood lock and de-energizes said at least one electrically operated engine component upon an actuation thereof, and a second operational mode energizes both said siren and said hood lock and de-energizes said at least one electrically operated engine component upon an actuation thereof after a specific length of time.

2. The new vehicle theft deterrent system of claim 1, and further comprising a code entrance means for selecting one of said two operational modes.

3. The new vehicle theft deterrent system of claim 2, wherein said code entrance means comprises a keypad.

4. The new vehicle theft deterrent system of claim 3, and further comprising a remote transmitter, said remote transmitter comprising a keypad.

5. The new vehicle theft deterrent system of claim 4, and further comprising a keypad disguising assembly means for selectively containing said keypad.

* * * * *